United States Patent
Sano

(10) Patent No.: US 9,079,058 B2
(45) Date of Patent: Jul. 14, 2015

(54) MOTION COORDINATION OPERATION DEVICE AND METHOD, PROGRAM, AND MOTION COORDINATION REPRODUCTION SYSTEM

(75) Inventor: Akane Sano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 225 days.

(21) Appl. No.: 12/905,332

(22) Filed: Oct. 15, 2010

(65) Prior Publication Data

US 2011/0097695 A1    Apr. 28, 2011

(30) Foreign Application Priority Data

Oct. 23, 2009 (JP) .............................. P2009-244304

(51) Int. Cl.
  *G09B 19/00*    (2006.01)
  *A63B 24/00*    (2006.01)

(52) U.S. Cl.
  CPC ......... *A63B 24/0006* (2013.01); *A63B 2220/40* (2013.01); *A63B 2220/803* (2013.01); *A63B 2225/50* (2013.01); *A63B 2244/22* (2013.01)

(58) Field of Classification Search
  USPC .................. 434/247, 250, 258, 307 A, 307 R
  See application file for complete search history.

(56) References Cited

U.S. PATENT DOCUMENTS

| | | | | | |
|---|---|---|---|---|---|
| 3,883,962 | A | * | 5/1975 | Kunig | 434/258 |
| 4,285,517 | A | * | 8/1981 | Morrison | 463/9 |
| 5,111,410 | A | * | 5/1992 | Nakayama et al. | 434/258 |
| 5,344,323 | A | * | 9/1994 | Burns | 434/250 |
| 5,743,744 | A | * | 4/1998 | Cassily et al. | 434/258 |
| 5,759,044 | A | * | 6/1998 | Redmond | 434/307 R |
| 6,220,865 | B1 | * | 4/2001 | Macri et al. | 434/247 |
| 6,289,114 | B1 | * | 9/2001 | Mainguet | 382/124 |
| 6,632,158 | B1 | * | 10/2003 | Nashner | 482/8 |
| 6,778,866 | B1 | * | 8/2004 | Bettwy | 700/56 |
| 7,228,649 | B2 | * | 6/2007 | Elliott | 36/127 |
| 7,413,442 | B2 | * | 8/2008 | Okunishi et al. | 434/323 |
| 7,568,963 | B1 | * | 8/2009 | Atsmon et al. | 446/175 |
| 2004/0219498 | A1 | * | 11/2004 | Davidson | 434/247 |
| 2005/0186542 | A1 | * | 8/2005 | Roncalez et al. | 434/247 |
| 2008/0214360 | A1 | * | 9/2008 | Stirling et al. | 482/9 |
| 2010/0048356 | A1 | * | 2/2010 | Hamilton | 482/4 |
| 2010/0105019 | A1 | * | 4/2010 | Chan et al. | 434/351 |

FOREIGN PATENT DOCUMENTS

| | | |
|---|---|---|
| JP | 2001-293246 | 10/2001 |
| JP | 3083641 | 11/2001 |
| JP | 3098422 | 10/2003 |
| JP | 3685731 | 6/2005 |
| JP | 2007-236765 | 9/2007 |
| JP | 2007-293042 | 11/2007 |

\* cited by examiner

*Primary Examiner* — Robert J Utama
*Assistant Examiner* — Sadaruz Zaman
(74) *Attorney, Agent, or Firm* — Finnegan, Henderson, Farabow, Garrett & Dunner, L.L.P.

(57) ABSTRACT

A motion coordination operation device is provided, which includes a movement information input unit inputting movement information supplied from respective sensor devices mounted on a plurality of users; and an operation unit operating coordination information that indicates the synchronization of motions of bodies or parts of the bodies of the plurality of users from the input movement information from the respective sensor devices, and generating control information for feedback outputs for the users based on the coordination information.

13 Claims, 11 Drawing Sheets

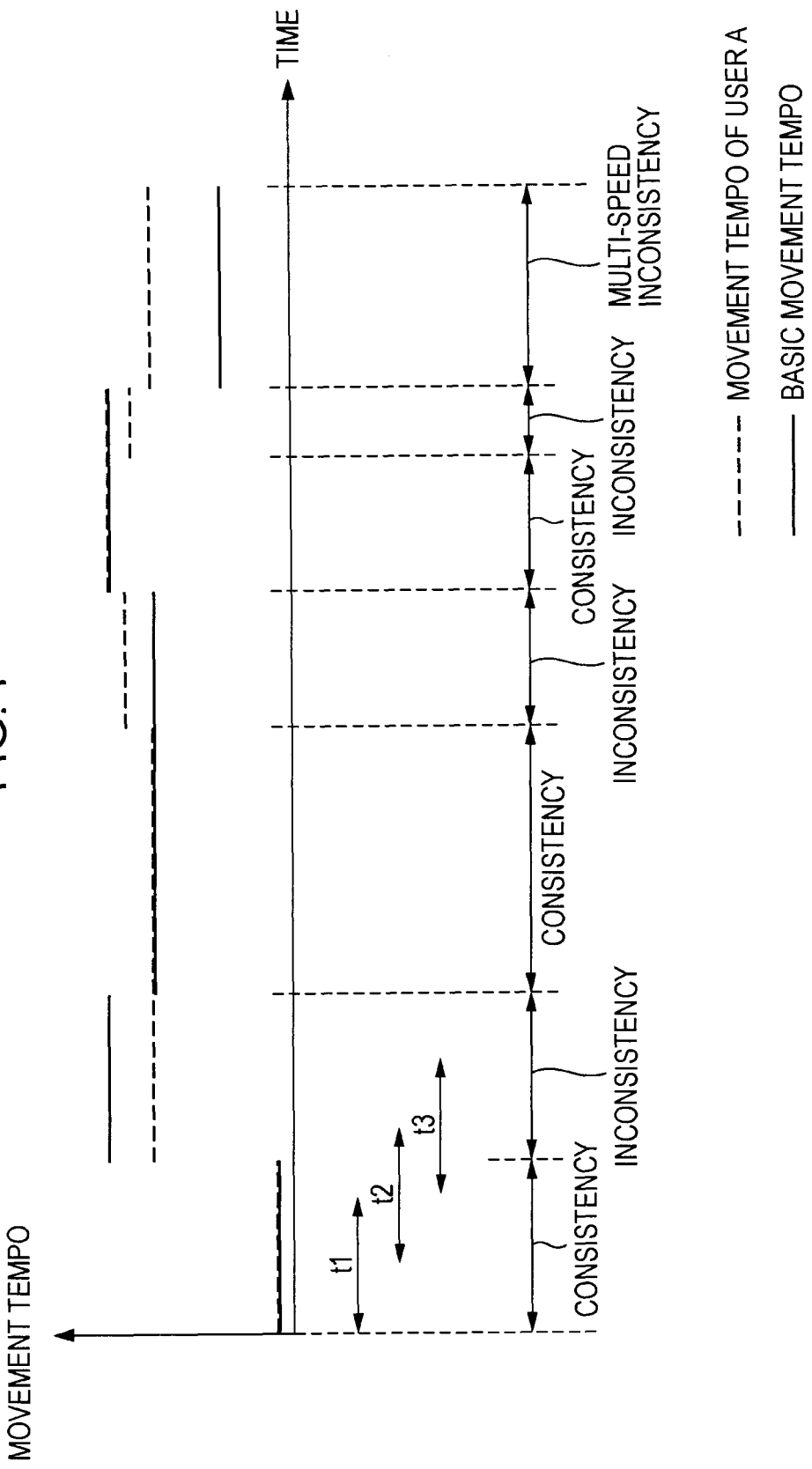

MOTION COORDINATION OPERATION DEVICE AND METHOD, PROGRAM, AND MOTION COORDINATION REPRODUCTION SYSTEM

BACKGROUND OF THE INVENTION

1. Field of the Invention

The present invention relates to a motion coordination operation device and method and a program, which operate coordination information that indicates the consistency of movements of plural users. Also, the present invention relates to a motion coordination reproduction system which performs reproduction based on motion coordination information with respect to respective users using the motion coordination operation device.

2. Description of the Related Art

In Japanese Registered Utility Model No. 3083641, a device which can make even one person learn dance steps by detecting the consistency of dance rhythms by a pressure sensor and displaying the same by LEDs is disclosed as a dance step exercise machine.

In Japanese Unexamined Patent Application Publication No. 2001-293246, Japanese Registered Utility Model No. 3098422, Japanese Unexamined Patent Application Publication No. 2007-293042, and Japanese Unexamined Patent Application Publication No. 2007-236765, an appliance that performs evaluation with respect to a user's input timing in a rhythm game, a music game, and the like, a device that plays on an artificial musical instrument using an acceleration sensor as an input device, and the like, are disclosed.

In Japanese Patent No. 3685731, a device that considers the correlation between respective manipulation information for plural users as the target of the determination is disclosed. In this case, the timing of the switch manipulation of the plural users is evaluated with respect to the performance of the musical accompaniment.

SUMMARY OF THE INVENTION

For example, in the case of harmonized movements such as a dance by plural users, it is difficult for a person who is performing the movements to evaluate whether the movements coincide with one another. Up till now, a third party checks the movements, or the movements are filmed on video to be evaluated later.

Here, it is effective in practicing dances and the like to evaluate the synchronization of movements of the plural user bodies or to feed the synchronization back to the users.

Dances or the like put emphasis on how the movements of plural persons are made to coincide with one another, and a system, which simply evaluates the harmony of the plural persons and receives the feedback thereof, makes it possible to quickly learn the harmonized motion.

Also, by applying such a system to various other kinds of sports, games, and amusements, it is considered that the system is appropriate to functional proficiency or contributes to increase of enjoyment.

In the related art, on the point of evaluation of a user's motion or movement, there are techniques used in game machines and the like as in the above-described patent documents. However, according to the techniques described in Japanese Registered Utility Model No. 3083641, Japanese Unexamined Patent Application Publication No. 2001-293246, Japanese Registered Utility Model No. 3098422, Japanese Unexamined Patent Application Publication No. 2007-293042, and Japanese Unexamined Patent Application Publication No. 2007-236765, the synchronization of the motions of the bodies of the plural users, for example, motions such as dances and the like, is not evaluated.

Also, according to Japanese Patent No. 3685731, the timing of the switch manipulation of the plural users is evaluated. However, this is to evaluate the manipulation timing to the end, but not to evaluate the synchronization of the motions of the users' bodies.

That is, in the case of dances by plural users, a system which evaluates whether each person dances in synchronization with another person and makes each person recognize the result of the evaluation does not exist.

In view of the above situation, it is desirable to make it possible to provide a device and a system which can realize the functional proficiency or increase enjoyment by determining the synchronization of the motions of plural users, for example, the rhythms, patterns, and the like, of the body movements, as coordination information and provides feedback to the users.

According to an embodiment of the present invention, there is provided a motion coordination operation device, which includes a movement information input unit inputting movement information supplied from respective sensor devices mounted on a plurality of users; and an operation unit operating coordination information that indicates the synchronization of motions of the bodies or parts of the bodies of the plurality of users from the input movement information from the respective sensor devices, and generating control information for feedback outputs for the users based on the coordination information.

The motion coordination operation device according to an embodiment of the present invention further includes a recording unit; wherein the recording unit records the movement information input from the respective sensor devices to the movement information input unit, and the operation unit reads the movement information from the recording unit at predetermined intervals and performs the operation of the coordination information.

In the motion coordination operation device according to an embodiment of the present invention, the operation unit calculates individual information (for example, a movement rhythm, a movement tempo, a movement pattern, a rhythm pattern of the movement, or a movement strength), as the movements of the respective users, from the movement information provided from the respective sensor devices, and calculates the coordination information by an operation using the individual information.

Also, in the motion coordination operation device according to an embodiment of the present invention, the operation unit determines basic movement information, as a group of all the users, from the individual information of the respective users, and calculates the coordination information by an operation using the basic movement information and the individual information.

In the motion coordination operation device according to an embodiment of the present invention, the operation unit calculates the coordination information, from the whole group of all the users, by the operation using the individual information of the respective users.

In the motion coordination operation device according to an embodiment of the present invention, the operation unit calculates the coordination information by comparing the individual information of the respective users with individual information of a specified user.

In the motion coordination operation device according to an embodiment of the present invention, the operation unit calculates the coordination information by comparing preset guidance movement information with individual information of the respective users.

In the motion coordination operation device according to an embodiment of the present invention, the operation unit generates the control information for performing different feedback outputs for the respective users.

In the motion coordination operation device according to an embodiment of the present invention, the operation unit generates the control information for performing the same feedback output for the respective users.

In the motion coordination operation device according to an embodiment of the present invention, the operation unit generates drive control information of a device that gives a tactile impetus to the users as control information for the feedback output for the users.

According to another embodiment of the present invention, there is provided a motion coordination operation method in an operation processing device capable of performing information input/output and operation processes, which includes the steps of inputting movement information supplied from respective sensor devices mounted on a plurality of users; operating coordination information that indicates the synchronization of motions of bodies or parts of the bodies of the plurality of users from the input movement information from the respective sensor devices; and generating control information for feedback outputs for the users based on the coordination information.

According to still another embodiment of the present invention, there is provided a program that makes an operation processing device execute the motion coordination operation method.

According to still another embodiment of the present invention, there is provided a motion coordination reproduction system, which includes a plurality of sensor devices, the motion coordination operation device, and a feedback device. Each of the sensor devices includes a detection unit detecting user movement information, and an output unit outputting the movement information detected by the detection unit. The feedback device includes a reproduction control unit controlling the driving of a reproduction device for the users based on the control information.

That is, according to the embodiments of the present invention, the motions of the plural users are detected as the movement information, and the coordination information that indicates the synchronization of the motions of the plural users is obtained from the movement information detected for the respective users. The coordination information means information that indicates whether the motions of the respective users (for example, body motions such as dances and the like) coincide with each other are a correlation or a discrepancy.

Also, feedback is given to the respective users based on the coordination information. For example, it is possible to inform the users of "the coincidence" of the motions, "the non-coincidence" of the motions, or the degree of deviation of the motions, by an impetus (vibration or the like) that the user can recognize through a tactile sensation.

According to the embodiments of the present invention, by giving feedback to the users on the basis of the coordination information based on the rhythms, patterns, strengths, and the like, of the movements of the plural users, the user knows the correlation (synchronization) to other users while performing the motion. Accordingly, it becomes possible to quickly learn the harmony of the motions or to increase enjoyment as an amusement.

BRIEF DESCRIPTION OF THE DRAWINGS

FIG. 7 is an explanatory diagram of the consistency/inconsistency of movement tempos according to an embodiment of the present invention;

DESCRIPTION OF THE PREFERRED EMBODIMENTS

1. System configuration
2. First processing example
3. Second processing example
4. Third processing example
5. Fourth processing example
6. Applications, modifications, and program

[1. System Configuration]

Figure 1:
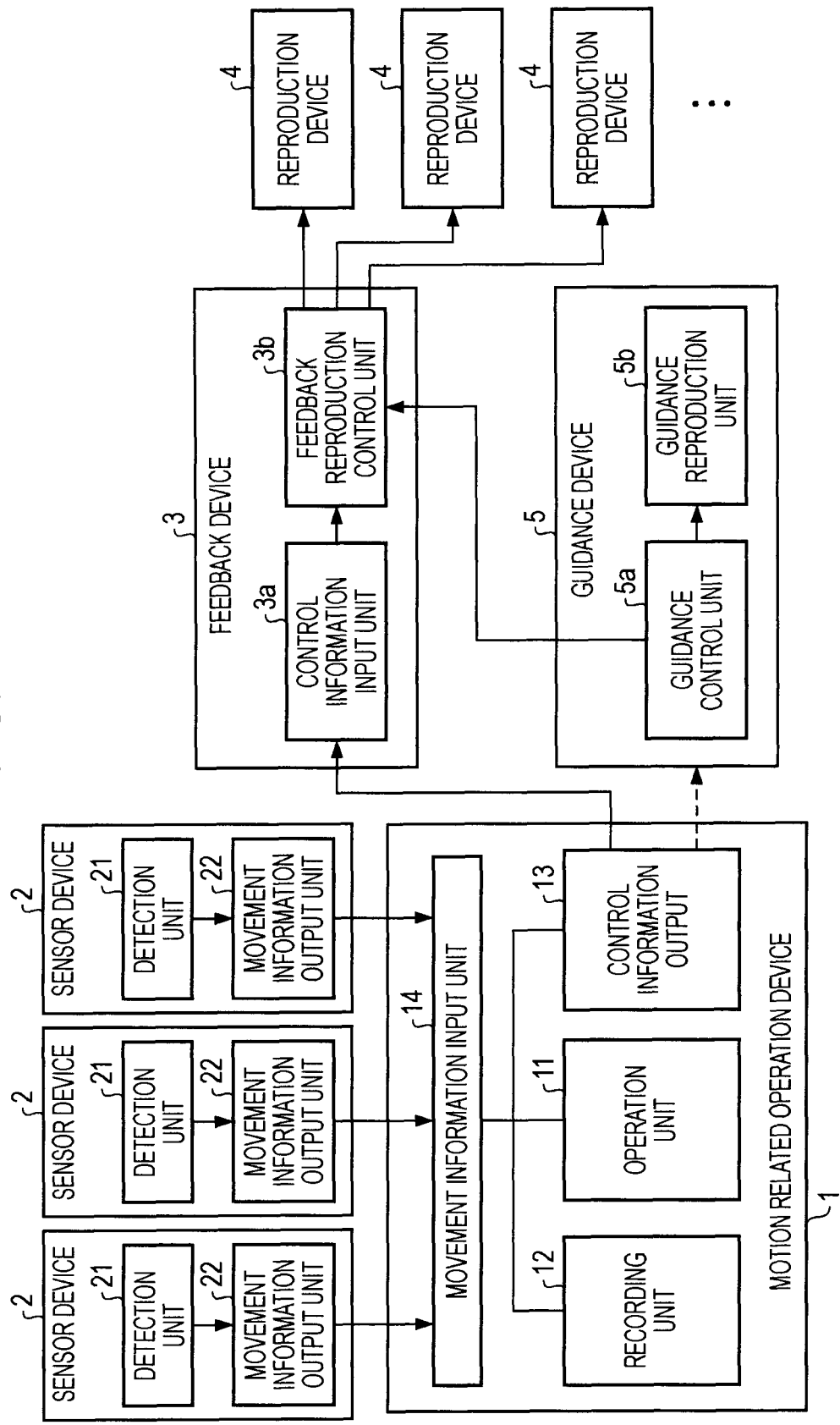
FIG. 1 is a block diagram of a motion coordination reproduction system according to an embodiment of the present invention.

FIG. 1 is a block diagram of a motion coordination reproduction system according to an embodiment of the present invention.

This motion coordination reproduction system includes a motion coordination operation device 1, a plurality of sensor devices 2, a feedback device 3, one or a plurality of reproduction devices 4, and a guidance device 5.

Each sensor device 2 includes a detection unit 21 and a movement information output unit 22. The detection unit 21, for example, may be an acceleration sensor, a pressure sensor, an angular velocity sensor, a vibration sensor, or the like, and detects a user's motion, acceleration according to the movement, or the like. The movement information output unit 22 outputs signals detected by the detection unit 21 to the motion coordination operation device 1 in real time.

Each of the plurality of sensor devices 2 may be a device which is mounted on the body of a user to be carried by the user or held by the user in his/her hand. Further, it is also considered that the sensor device is in the form of a seat or a support on which the user takes exercise.

In the case of carrying the sensor device on the body of the user, for example, it is considered that the sensor device is in a form that can be mounted in a necessary position, such as a wrist, an ankle, a neck, an arm, a trunk, a leg portion, and the like, by a mounting belt, a tape, and the like. Also, the sensor device may be of a headphone type or a cap type, which is mounted on a head portion. Further, the sensor device may be of a necklet type that is put on a neck, a type that is mounted on clothes with a clip, a type that is put in a pocket, and the like.

In any type, it is sufficient if the sensor device 2 can detect movement information in response to the movement of the whole body or a part of the body (for example, hand, foot, or the like) of the user.

It is also considered that the sensor device is not a dedicated sensor device, but is a device carried by the user, for example, in the form of a sensor device 2 built in a remote controller.

As an example, a plurality of sensor devices 2, rather than a single sensor device 2, may be mounted on the right hand, left hand, right foot, and left foot of the user, respectively. That is, each user may carry a plurality of sensor devices 2.

The movement information output unit 22 outputs signals according to the acceleration or pressure detected by the detection unit 21 as movement information, and performs communication with the motion coordination operation device 1 by either a wired output or a wireless output (radio wave signal, infrared signal, or the like).

Further, it is not necessary for the plurality of users to be in the same place, and for example, the users may be in remote places, respectively. In this case, the respective sensor devices 2 may transmit the movement information to the motion coordination operation device 1 by network communication.

The movement information, which is data transmitted from the movement information output unit 22 to the motion coordination operation device 1, may be data of detected values of the detection unit 21 or encoded data.

In this case, in order for the motion coordination operation device 1 to identify the movement information of the respective users, it is appropriate to include an ID for the sensor device 2 or a user ID in the transmitted data.

However, in the case of a wired transmission or even if the ID is not used through the setting of a modulation frequency, it is possible that the motion coordination operation device 1 identifies which sensor device 2 the movement information is transmitted from.

The motion coordination operation device 1 includes a motion information input unit 14, a recording unit 15, an operation unit 11, and a control information output unit 13. According to the motion coordination operation device 1, the motion information input unit 14, the recording unit 15, the operation unit 11, and the control information output unit 13 are realized on a hardware configuration such as a CPU, a RAM (Random Access Memory), a ROM (Read Only Memory), an input/output interface, and the like. Accordingly, the motion coordination operation device 1 may be configured as a general operation processing device such as a personal computer or the like. Of course, the motion coordination operation device 1 may be configured as a dedicated device.

The movement information input unit 14 receives the movement information from the respective sensor devices 2 through wired, wireless, or network communications. Also, the movement information input unit 14 performs demodulation or the like according to the communication system.

The movement information received from the respective sensor devices 2 into the movement information input unit 14 is recorded in the recording unit 12. The recording unit 12 may include a RAM, an HDD (Hard Disk Drive), other kinds of recording media, and their recording/reproduction processing systems.

The recording unit 12 records the received movement information, and simultaneously reproduces the movement information from the respective sensor devices 2 in a predetermined period according to the request from the operation unit 11 to transmit the movement information to the operation unit 11.

The operation unit 11 performs an operation process using the movement information as in the first to fourth processing examples to be described later. That is, the operation unit 11 operates coordination information that indicates the synchronization of the bodies or parts of the bodies of the plural users from the movement information from the respective sensor devices 2, and generates control information for feedback output for the users based on the coordination information.

For example, in the case where the movement information is information that indicates the motion of the users detected by the acceleration sensor, the operation unit 11 is able to obtain peak-to-peak time of the acceleration or know the strength of the movement, rather than the rhythm, tempo, timing or amplitude value of the movement (in the case of walking/running, landing of the heel) from the peak of a waveform of the acceleration, by performing spectrum analysis or operation of self correlation using the acceleration.

Also, the movement pattern may be known from the pattern of the existing waveform of the acceleration.

The operation unit 11 may detect whether the motions of the plural users coincide with one another or whether the motions exist in a preset range of several hundred milliseconds to several seconds on the basis of the movement tempo detected by the acceleration sensor.

The synchronization of the motions of the users is calculated as the coordination information.

In the detailed examples to be described later, the expressions "correlation" and "discrepancy" are used as the coordination information. Both the correlation and the discrepancy are indexes that indicate the synchronization of the plural users, and their relation is discrepancy=1/correlation.

Specifically, for example, the movement tempo, the movement strength, the movement region, and the movement pattern are estimated, for a period of several hundred milliseconds to several seconds, from the movement information of the acceleration sensor, and whether there is a relation between the plurality of users for a period of several frames in a time series is determined. The correlation and the discrepancy are expressed as functions of the movement tempo, the movement strength, the movement range, the movement pattern, the number of coordination persons, and the number of uncoordinated persons.

Further, the operation unit 11 generates a control signal for feedback reproduction that makes the user recognize the situation of the synchronization based on the coordination information.

In the description of the present invention, the feedback reproduction means the reproduction that presents the synchronization or the degree of synchronization between the user motions to the users by tactile impetus, video, sound, or the like.

The control information for the feedback reproduction generated by the operation unit 11 is supplied from the control information output unit 13 to the feedback device 3.

The feedback device 3 is configured integrally with the motion coordination operation device 1 or separately from the motion coordination operation device. In particular, the feedback device 3 is a device that drives the reproduction device 4, and due to its necessity, it may be a device separate from the motion coordination operation device 1. That is, the feedback device 3 may be arranged in a position that is set apart from the motion coordination operation device 1, in the sense that the feedback device 3 is installed in a position where the user exists.

The feedback device 3 includes a control information input unit 3a and a feedback reproduction control unit 3b.

The control information input unit 3a receives and inputs the control information from the control information output unit 13 of the motion coordination operation unit 1.

The communication between the control information output unit 13 and the control information input unit 3a may be any one of a wired communication, a wireless communication, and a network communication. If the motion coordination operation device 1 and the feedback device 3 are combined into an appliance, the communication may be realized as the transmission of internal control information of the corresponding appliance.

The feedback reproduction control unit 3 controls the driving of the reproduction device 4 based on the control information received by the control information input unit 3a.

As an example, the reproduction device 4 may be a device that gives a tactile impetus to the user. For example, it is assumed that the reproduction device 4 is a device that is mounted on the user's body, arm, wrist, leg portion, or the like, to give the rhythm, vibration, pressure, or the like, to the user. In the case of such a reproduction device 4, it may be considered that the reproduction device 4 and the sensor device 2 are integrally configured into a device.

Also, the reproduction device 4 may be a video monitor device, an audio speaker device, a headphone device, or the like, and present information on the users by video or audio.

That is, the reproduction device 4 may be a so-called mount type device or a device carried on the user's body.

Also, the reproduction device 4 may perform the reproduction, which may be any one of a tactile impetus reproduction, an audio reproduction, and a video reproduction, with respect to each user or with respect to all the users.

The guidance device 5 is a device that performs the guide output of the operations of the users. The guidance device 5, for example, includes a guidance control unit 5a and a guidance reproduction unit 5b.

The guidance control unit 5a controls the execution of the guidance reproduction. The guidance reproduction performs information presentation to the user as the guidance.

The guidance device 5 is not necessarily installed in terms of the system.

For example, in the case of a group dance, the guidance device 5 may be considered to reproduce the tempo of the dance, music, video, and the like, through an audio speaker device or a monitor device as the guidance reproduction unit 5b. In this case, the guidance device 5 is not considered as a system configuration appliance, but is considered as an audio device or a video device of the group.

On the other hand, it is also considered to use the guidance device 5 in association with the system operation.

For example, in the reproduction device 4, it is also considered to perform the guidance reproduction that overlaps the feedback reproduction.

In this case, the guidance control unit 5a may perform a predetermined control by receiving the control information from the motion coordination operation device 1, or request the feedback reproduction control unit 3b to perform the reproduction operation through the reproduction device 4 in addition to the guidance reproduction.

In such a motion coordination reproduction system, even if the respective devices have diverse shapes, arrangements, or are formed integrally/separately, the synchronization of movements of all the bodies or parts of the bodies of the plural users is obtained as the coordination information, and the feedback reproduction for the users are performed appropriately. In order to realize the corresponding operation, the device configuration and the communication type between the devices may be appropriately changed according to the place where the respective users are.

Also, according to the purpose of the system operation, such as what movement the system is used for, which synchronization is to be determined, and the like, the configuration (the contents of detection) of the sensor device 2, the feedback reproduction type, and the like, are appropriately set.

Figure 3:
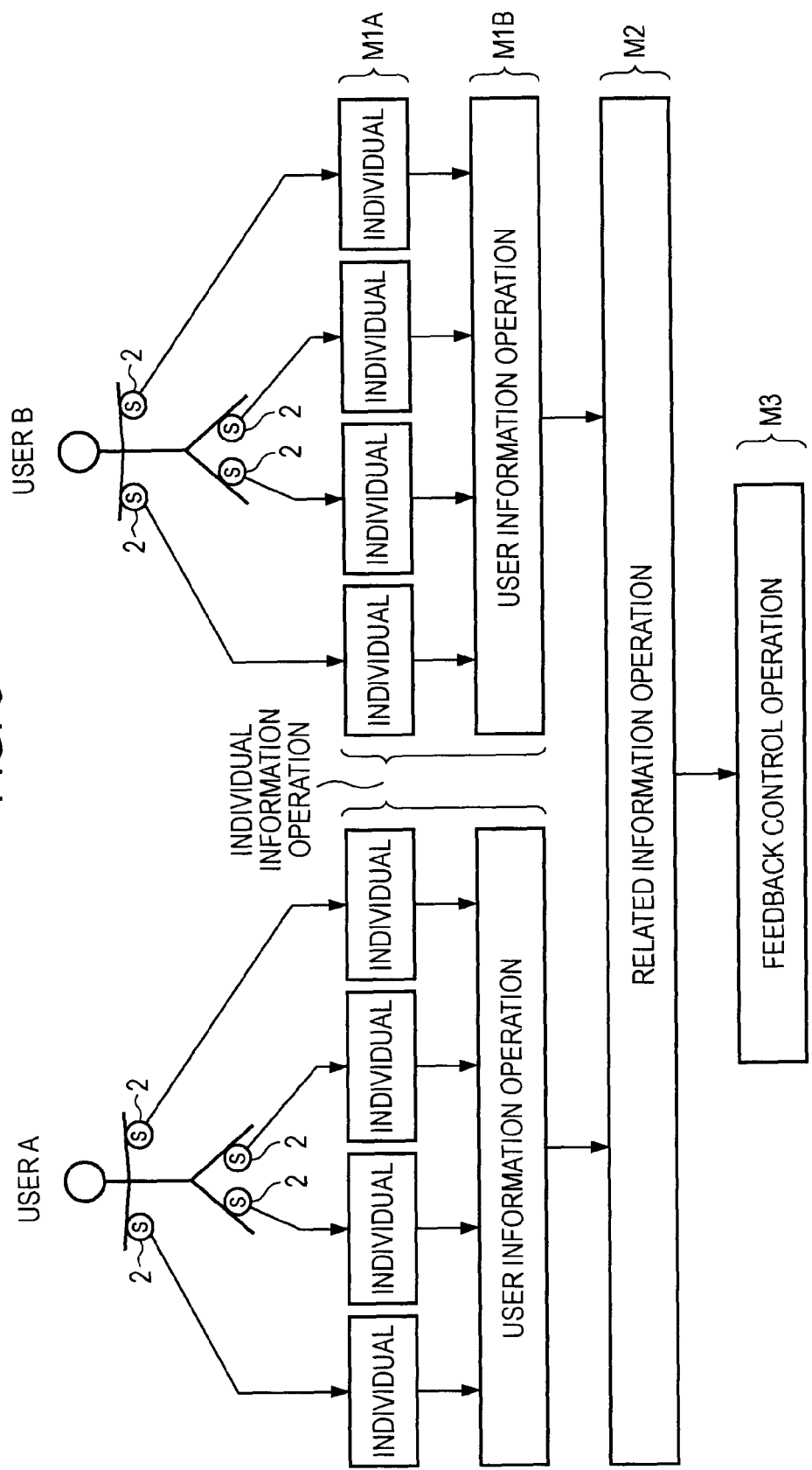
FIG. 3 is an explanatory diagram illustrating an example of a motion coordination operation according to an embodiment of the present invention.
Figure 4:
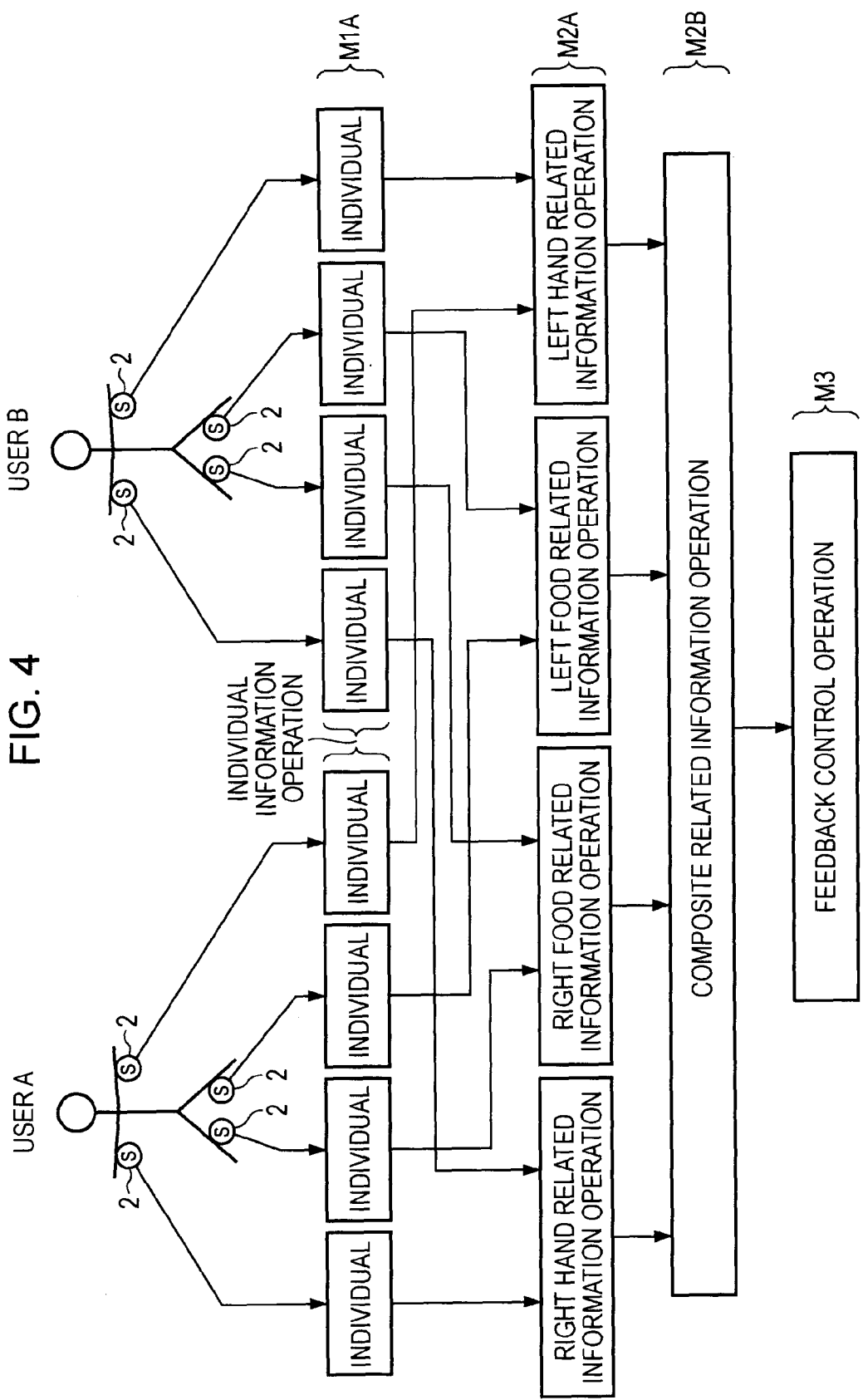
FIG. 4 is an explanatory diagram illustrating an example of a motion coordination operation according to an embodiment of the present invention.

Also, diverse operation process types of the motion coordination operation device 1 may be considered. Hereinafter, examples of the operation process types are shown in FIGS. 2, 3, and 4.

Figure 2:
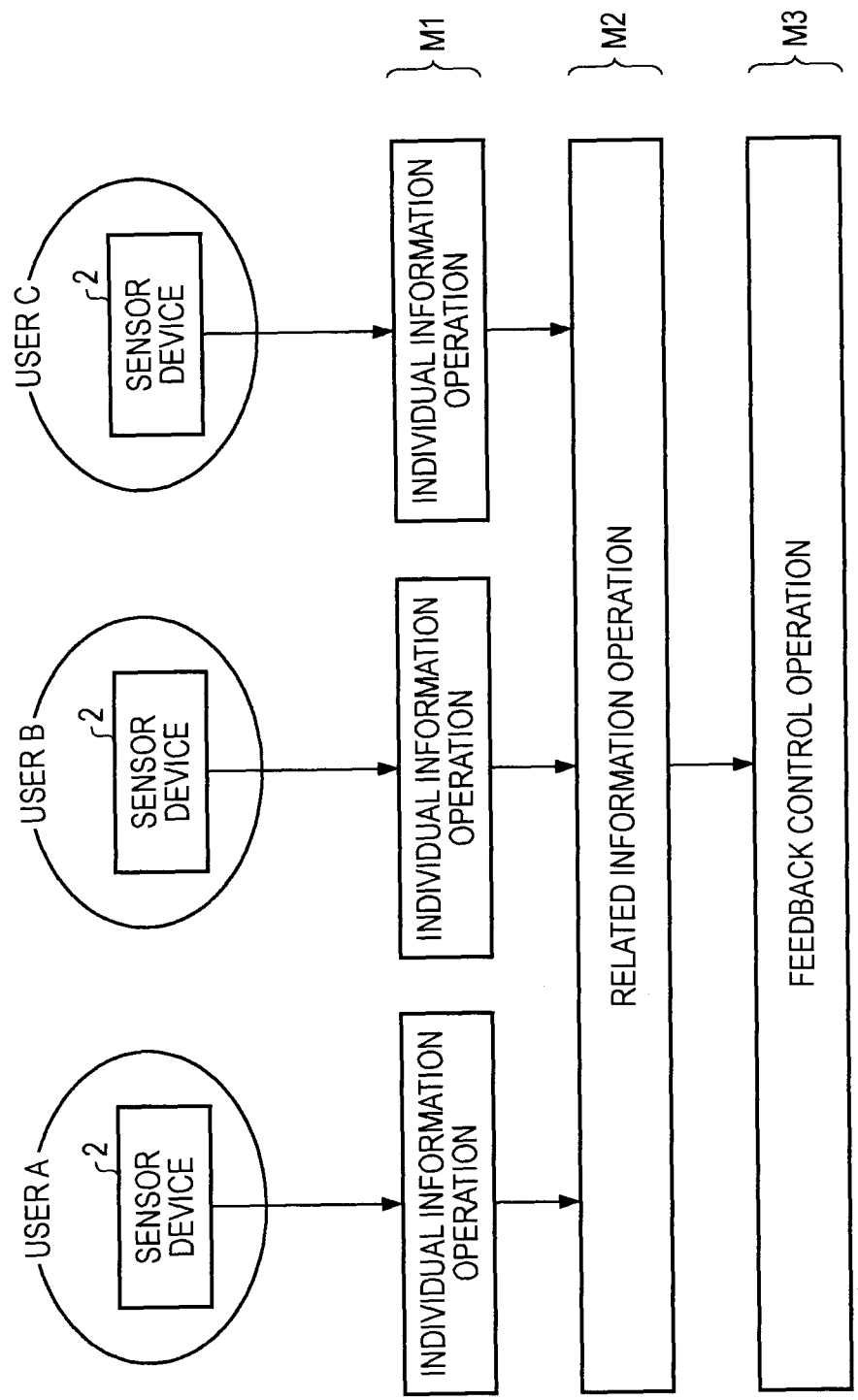
FIG. 2 is an explanatory diagram illustrating an example of a motion coordination operation according to an embodiment of the present invention.

FIG. 2 shows a case where each of users (users A, B, and C) has one sensor device 2 mounted thereon. In this case, an operation unit 11 of the motion coordination operation device 1 performs operations M1, M2, and M3.

As the operation M1, the operation unit 11 performs individual information operation for the users A, B, and C using the movement information from the respective sensor devices 2. The individual information is information obtained by estimating the personal motion information of the respective users. For example, the operation unit 11 determines the movement rhythm, the movement tempo, the movement strength, the movement pattern, and the movement rhythm pattern for each person.

Next, the operation unit 11 performs the coordination information operation as the operation M2. That is, the operation unit 11 calculates the correlation or the discrepancy from the respective user motions, i.e. motion information obtained by the individual information operation, as the synchronization between the respective users.

Last, the operation unit 11 performs the feedback control operation as the operation M3. In the operation M3, the operation unit 11, for example, generates the control information for the user tactile impetus reproduction according to the coordination information obtained from the operation M2. In this case, the individual control information for the respective users may be generated or control information for the whole user group may be generated.

For example, as the individual control information, the control information for expressing the deviation state of the respective user movement rhythms as the feedback reproduction is generated for each user with respect to the basic movement rhythm.

Also, as the control information for the whole group, the control information for expressing the consistent state or the deviation state as the feedback reproduction is generated as the synchronization of the movements of all the persons.

FIG. 3 shows the case where each user has a plurality of sensor devices 2 mounted thereon. As an example, a user carries the sensor devices 2 on his/her right hand, left hand, right foot, and left foot, respectively. Accordingly, the respective sensor devices 2 output movement information as the movement of the right hand, the movement of the left hand, the movement of the right foot, and the movement of the left foot, respectively.

Even in this case, the operation unit 11 performs the individual information operations from the movement information from the respective sensor devices 2 as the operation M1A. However, the individual information operations in this case become operations for obtaining motion information of the respective portions of the body from the movement information from the respective sensor devices 2 mounted on the respective users.

That is, the operation unit 11 determines the movement rhythms, movement tempos, movement strengths, movement patterns of the right hand, left hand, right foot, and left foot of the user A. The operation unit 11 also determines the same with respect to the user B.

Then, the operation unit 11, as the operation M1B, performs the user information operation as the individual information in the unit of a user. For example, the operation unit 11 calculates the whole movement information of the user from the movement rhythms of the right hand, left hand, right foot, and left foot of the user A. For example, the operation unit 11 obtains the rhythms or patterns of the whole movement.

Then, the operation unit 11 performs the coordination information operation as the operation M2. That is, the operation unit 11 calculates the correlation or the discrepancy from the respective user motions, i.e. respective motion information obtained by the individual information operation M1A and user information operation M1B, as the synchronization between the respective users.

Last, the operation unit 11 performs the feedback control operation as the operation M3. In the operation M3, the operation unit 11, for example, generates the control information for the user tactile impetus reproduction according to the coordination information obtained from the operation M2. Even in this case, the individual control information for the respective users may be generated or control information for the whole user group may be generated.

As shown in FIG. 3, it may be considered that the motions of a plurality of portions of one user are detected as the movement information, the composite movement of the user body of one person is estimated from the detected movement information, and then the coordination information operation is performed by comparing the composite movement of the body between the plurality of users.

In the same manner, the operation process as shown in FIG. 4 is considered as an example of the user's mounting of the plurality of sensor devices 2.

As in the case of FIG. 3, each user has a plurality of sensor devices 2 mounted thereon.

The operation unit 11 performs the individual information operation from the movement information from the sensor devices 2 as the operation M1A. That is, the operation unit 11 performs the operation to obtain movement rhythms and so on, as the motion information of the respective portions of the body, from the movement information from the respective sensor devices 2 mounted on the respective users.

Then, the operation unit 11 performs the coordination information operation for the respective portions of the user's body as the operation M2A.

That is, the operation unit 11 compares the movement rhythms of the right hands of the respective users. Also, the operation unit 11 compares the movement rhythms of the right foots of the respective users. Also, the operation unit 11 compares the movement rhythms of the left foots of the respective users. Also, the operation unit 11 compares the movement rhythms of the left hands of the respective users.

As described above, the operation unit 11 calculates the correlation or the discrepancy of the motions for each body region.

Then, the operation unit 11 performs the composite coordination information operation of the users as the operation M2B. That is, the operation unit 11 calculates the composite correlation or discrepancy using the correlation or discrepancy values of the right hand, the right foot, the left foot, and the left hand of the respective users.

Last, the operation unit 11 performs the feedback control operation as the operation M3. In the operation M3, the operation unit 11, for example, generates the control information for the user tactile impetus reproduction according to the composite coordination information obtained from the operation M2B. Even in this case, the individual control information for the respective users may be generated or the control information for the whole user group may be generated.

As shown in FIG. 4, it may be considered that the motions of a plurality of portions of one user are detected as the movement information, and from them, coordination information is operated for the body portions of the respective users, and then the coordination information operations are performed between the plurality of users, from the coordination information of the respective portions of the bodies. In this case, the correlation or discrepancy of the respective portions of the body is weighted, and then the composite coordination information operation is performed.

The above-described examples are merely examples of the operation techniques, and other diverse examples may be considered. In accordance with the kind of the sensor device, the number of sensor devices being used, the contents of detection, mounting position, the contents of movement, the purpose of the feedback reproduction, and the like, the operation technique may be selected.

[2. First Processing Example]

Hereinafter, the detailed processing examples of the motion coordination operation device 1 will be described. It is assumed that the motion coordination reproduction system performs the feedback reproduction with respect to the respective users in the case where a plurality of users practices gymnastics or dances as a group.

Figure 5:
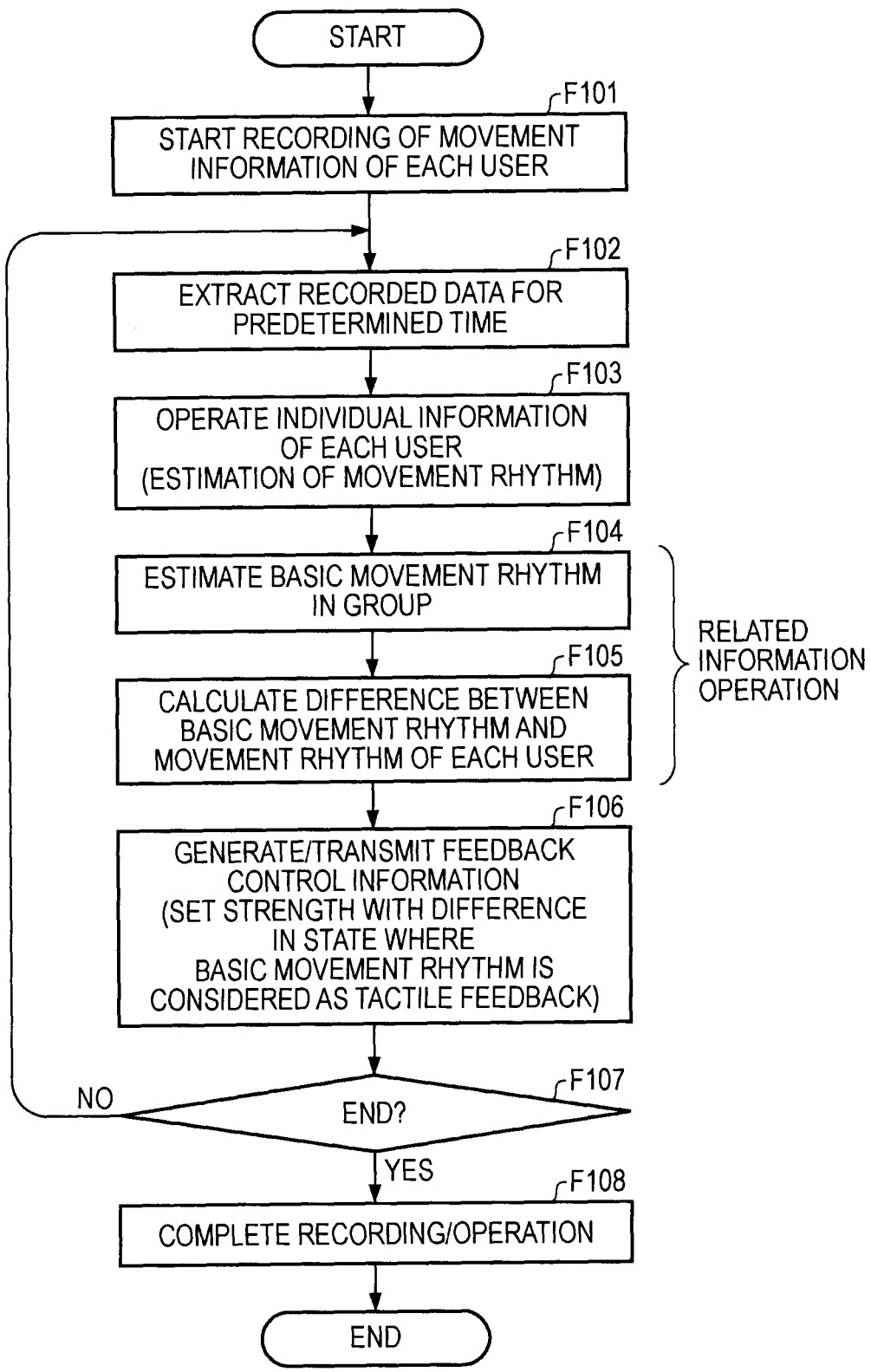
FIG. 5 is a flowchart illustrating a first processing example according to an embodiment of the present invention.

FIG. 5 shows the processing of the motion coordination operation device 1.

It is assumed that the plurality of users dances, for example, with the respective sensor devices 2 mounted on or carried by the users, as shown in FIG. 2. The sensor device 2, for example, includes a detection unit 21 as the acceleration sensor, and outputs in real time the detected acceleration information through the movement information output unit 22 as the movement information.

In step F101 of FIG. 5, the motion coordination operation device 1 starts the recording of the movement information. That is, if the motion information input unit 14 of the motion coordination operation device 1 receives the movement information from the respective sensor devices 2, the motion coordination operation device 1 records the received motion information in the recording unit 12. Thereafter, such a recording process is continuously performed.

In this case, the movement information from the respective sensor devices 2 is recorded so that it is discriminated which sensor device (which user) the movement information is from. For example, as described above, the recording is performed to make the IDs (identification information) of the sensor devices 2 correspond to the respective movement information.

In step F102, the operation unit 11 reads the movement information for a predetermined period with respect to the movement information from the respective sensor devices 2, which is recorded in the recording unit 12. The predetermined period, for example, is a set period such as 10 seconds, 30 seconds, one minute, or the like.

Although periods t1, t2, t3 and so on are illustrated in FIG. 7, the operation unit 11 reads the movement information from the recording unit 12 in the priority period t1.

In step F103, the operation unit 11 performs the individual information operation of the users of the respective sensor devices 2 using the movement information from the respective sensor devices 2, which is read from the recording unit 12. Here, it is exemplified that the estimation of the movement rhythms is performed.

If the movement performed by the users is a periodic movement, a tempo (for example, the number of beats per minute (BPM)) may be used as the estimation of the movement rhythm.

For example, as the individual information operation, the tempo (BPM) of each user in an object period (t1: for example, one minute) this time is estimated from the movement information of the acceleration sensor or the like. Specifically, the tempo is calculated by detecting peak values of the acceleration sensor for one minute. The peak detection is possible by performing spectrum analysis of the acceleration values or self-correlation operation thereof.

The above-described calculation is performed with respect to the respective users (movement information from the respective sensor devices 2).

In this case, it may be considered to calculate the movement pattern, the rhythm pattern, or the movement strength, rather than the movement rhythm (tempo), in accordance with the user's motion, the kind of gymnastics or dances, and other movement types.

Figure 8A:
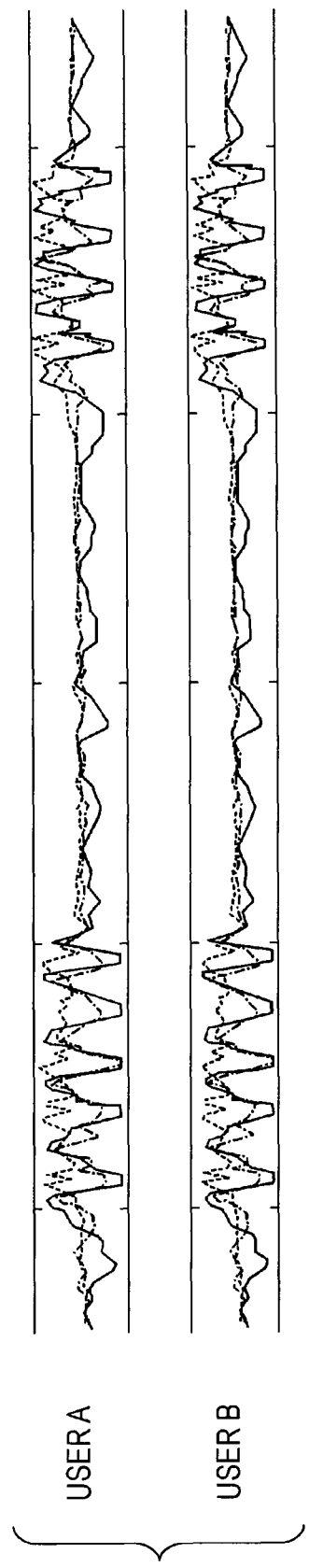
FIGS. 8A and 8B are explanatory diagrams of motion patterns and rhythm patterns according to an embodiment of the present invention.

For example, FIG. 8A shows acceleration sensor values for the users A and B. On each sensor device 2 mounted on the respective users, an acceleration sensor in X, Y, and Z directions is mounted, and waveforms indicated by a solid line, a dashed line, and a dashed dot line in the drawing are obtained as the acceleration sensor values (movement information) in the respective direction. The movement pattern may be known by the existing waveform pattern of the acceleration sensor values.

Figure 8B:
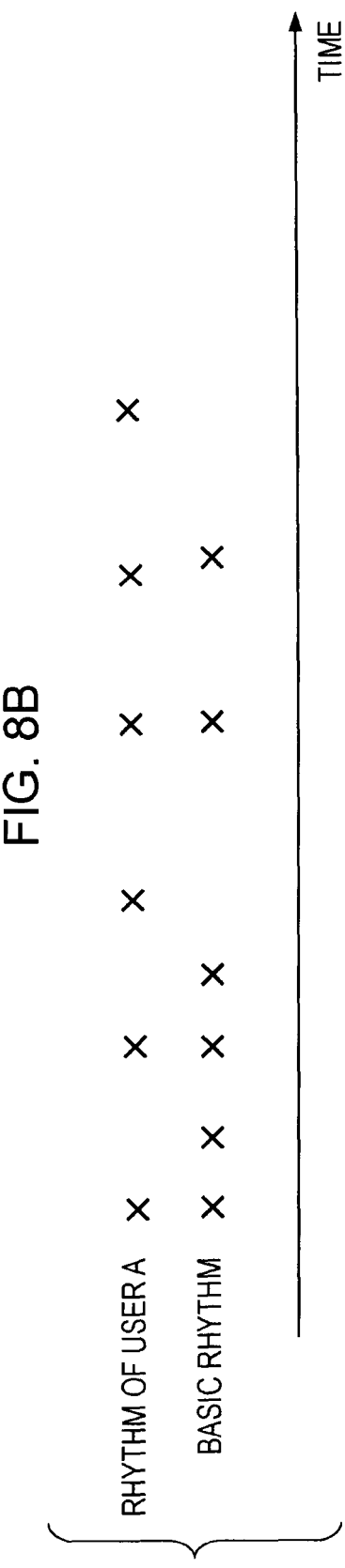

Also, FIG. 8B shows the rhythm of user A. For example, by detecting peaks of the acceleration sensor values from the sensor device 2 mounted on the user A, the rhythm pattern of the user A may be detected. In this case, the rhythm pattern is not a simple tempo as the rhythm, but indicates the time length change between the respective beat timings.

Further, although not illustrated, the movement strength or the strength pattern may be detected from the amplitude of the waveform of the acceleration sensor.

In step F103 of FIG. 5, the tempo (movement rhythm) and so on is calculated as the individual information of each user.

Then, in step F104, the operation unit 11 estimates the basic movement rhythm in a group as the plural users. For example, in the case of estimating the tempo of each user as the movement rhythm, a tempo that is the comparison basis of the tempo is determined as the basic movement rhythm.

Figure 6:
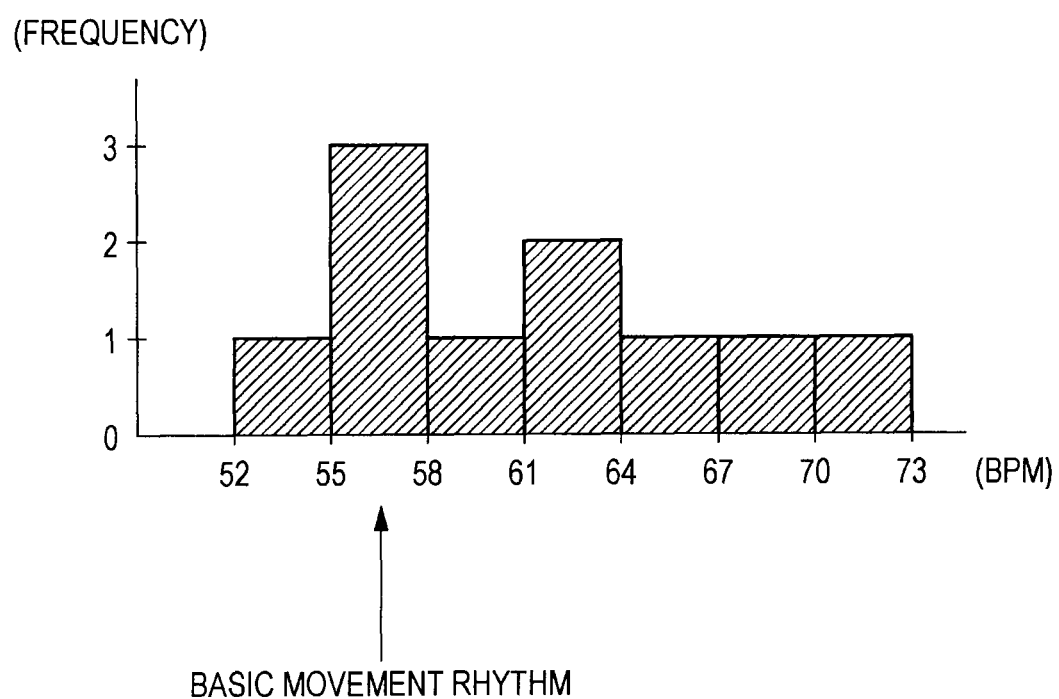
FIG. 6 is an explanatory diagram of a setting of a basic movement rhythm according to an embodiment of the present invention.

This basic movement rhythm is a representative movement rhythm in the group. For example, with respect to the movement rhythm of the individual user calculated in step F103, the distribution as shown in FIG. 6 is discriminated. Since the movement rhythm (tempo (BPM)) somewhat differs for each user, the distribution as shown in FIG. 6 is obtained, and the tempo having the highest frequency, that is, the tempo having the largest number of users is determined as the basic movement rhythm.

In this case, regardless of the frequency (the number of users), it may be considered that the basic movement rhythm is estimated as an average value of tempos of all the users, or the basic movement rhythm is calculated by correcting the tempo having the highest frequency to an average value and so on.

Any way, it is sufficient if the basic movement rhythm is to estimate the tempo and so on, which all the users desire to make in coincidence with the tempo.

In step F105 of FIG. 5, the basic movement rhythm and the discrepancy are calculated with respect to the movement rhythms of the respective users. The discrepancy may be calculated as follows.

First, if the movement rhythm (tempo (BPM)) of a certain user is higher than the basic movement rhythm (tempo (BPM)), it is assumed that "tempoα" is the users movement rhythm, and "tempoβ" is the basic movement rhythm.

On the other hand, if the movement rhythm (tempo (BPM)) of the user is lower than the basic movement rhythm (tempo (BPM)), it is assumed that "tempoα" is the basic movement rhythm, and "tempoβ" is the movement rhythm of the user. That is, the faster one becomes "tempoα".

Also, the discrepancy is obtained as follows.

$$\text{Discrepancy} = \text{tempo}\alpha/\text{tempo}\beta - \text{int}(\text{tempo}\alpha/\text{tempo}\beta)$$

Here, "int" indicates an integer value part.

For example, if it is assumed that the tempo of the movement rhythm of a certain user=60, and the tempo of the basic movement rhythm=56, the discrepancy becomes 60/56-int(60/56). If 60/56=1.07, int(60/56) becomes "1" that is the integer part of 1.07.

Accordingly, the discrepancy is obtained as Discrepancy=1.07-1=0.07.

Also, for example, if it is assumed that the tempo of the movement rhythm of another user=48, and the tempo of the basic movement rhythm=56, the discrepancy becomes 56/48-int(56/48). If 56/48=1.16, the discrepancy is obtained as 1.16-1=0.16.

Also, if the movement rhythm of another user is equal to the tempo (=56) of the basic movement rhythm, the discrepancy becomes 1-1=0.

As a result, the discrepancy value becomes larger as the discrepancy between the user's tempo and the tempo of the basic movement rhythm becomes greater.

The operation unit 11 obtains the discrepancy with respect to the movement rhythms of the respective users.

In step F106, the operation unit 11 generates the feedback control information, and transmits the feedback control information from the control information output unit 13 to the feedback device 3.

The feedback control information is generated according to the discrepancy.

As an example, the feedback reproduction is to transfer the basic movement rhythm to the user as the tactile impetus. For example, it is assumed that the reproduction device 4 may be a pressure device, a vibrator, or the like, that is mounted on the skin of the user.

Also, it is assumed that the basic movement rhythm is transferred by the reproduction device 4. That is, the tactile impetus is given to the user as the tempo of the basic movement rhythm.

Here, for each user, the strength of the tactile impetus is set according to the value of the discrepancy.

That is, the operation unit 11, as the feedback control information, generates tempo information as the basic movement rhythm and the strength coefficient according to the discrepancy value for each user, and outputs their control information to the feedback device 3.

The strength coefficient may be the discrepancy value itself or a value that is obtained by multiplying the discrepancy value by a predetermined coefficient, and further, may be a value obtained by multiplying them by a time value. For example, although it is expected that the discrepancy value is changed in the process of movement, the length of a period, in which the discrepancy value that exceeds the predetermined value is obtained, is considered to be the coefficient. That is, as the period in which deviation of the motions occurs is longer, the strength coefficient becomes higher.

By such feedback control information, the feedback reproduction control unit $3b$ of the feedback device 3 controls the driving of the tactile impetus reproduction with respect to the respective reproduction devices 4 mounted on the respective users.

That is, although the tempo as the basic movement rhythm is transferred to the tactile sensation with respect to all the users, the tactile impetus becomes greater as the deviation of the motions becomes larger. That is, the user who has larger deviation of the motions feels the tempo of the basic movement rhythm stronger.

At this time, although it is reasonable to do so for this, it is necessary that the control information for the respective users correspond to the reproduction devices 4 mounted on the respective users. The feedback reproduction control unit $3b$ controls the driving of the reproduction device 4 by setting the reproduction strength of the reproduction device 4 mounted on the user in accordance with the control information (strength coefficient according to the discrepancy) for the respective users.

If the tempos for the respective users coincide with each other, the user feels small with respect to the rhythm felt with tactile sensation by the reproduction device 4, while if the tempos deviate from each other, the user feels large with respect to the rhythm felt with tactile sensation.

The operation unit 11, after the processing in step F106, returns from step F107 to step F102 to continue the same process. That is, during the continuous system operation, the operation unit 11 repeats performing of steps F102 to F106.

If the system operation is ended, the operation unit 11 proceeds from step F107 to step F108, and ends the recording process of the movement information in the recording unit 12, the operation process of the operation unit 11, and the generation/output process of the feedback control information to terminate a series of operations.

An example of the system operation realized by the process of FIG. 5 will be described with reference to FIG. 7.

As described above, the operation unit 11 performs the processing of FIG. 5 with respect to the movement information of the respective users for each period of t1, t2, t3, or the like.

In FIG. 7, the vertical axis represents movement tempo, and the horizontal axis represents time. A dashed line indicates the movement rhythm (tempo) of a certain user A, and a solid line indicates the basic movement rhythm (tempo) estimated in step F104.

A period in which the tempo of the user A almost coincides with the basic movement rhythm is indicated as "consistency" in the drawing. A period in which the tempo of the user A deviates from the basic movement rhythm is indicated as "inconsistency".

Also, when the user's movement tempo is n times (for example, double speed consistency) the tempo of the basic movement rhythm, it is indicated as "double speed consistency".

Here, the user A feels small with respect to the basic movement rhythm by the tactile impetus reproduction in a period in which the user's movement tempo is "consistency" or "double speed consistency". On the other hand, the user A feels the basic movement rhythm emphasized according to the amount of deviation (or time length in which the user's movement tempo further deviates from the basic movement rhythm) in a period of "inconsistency".

If the basic movement rhythm felt with tactile sensation becomes stronger, the user feels that its motion deviates from the basic movement rhythm, and performs dancing with attention to the coincidence of the tempo with the basic movement rhythm. By doing this, the motion may be corrected so that the tempo coincides with the whole movement. That is, it is sufficient if the motion is performed so that the tactile impetus is not felt as far as possible. In other words, the tactile impetus reproduction, due to the size of the impetus, becomes the feedback reproduction such as learning the user having the movement deviation a correct tempo with the reproduction strength according to the deviation state.

Accordingly, the user can be aware of the relation with other users as performing the operation, and quickly learns the harmony of the operations. Also, the user can take pleasure in increasing the correlation.

At this time, in the above-described example, although it is exemplified that the discrepancy is $$\text{Discrepancy}=\text{tempo}\alpha/\text{tempo}\beta-\text{int}(\text{tempo}\alpha/\text{tempo}\beta),$$

a predetermined threshold value X is set, and if X is $$|\text{tempo}\alpha/\text{tempo}\beta-\text{int}(\text{tempo}\alpha/\text{tempo}\beta)|<X,$$

it corresponds to the "consistency". If X is $$|\text{tempo}\alpha/\text{tempo}\beta-\text{int}(\text{tempo}\alpha/\text{tempo}\beta|\geq X,$$

it corresponds to the "inconsistency". In this case, the correlation of the motion can be expressed by two values (consistency/inconsistency).

In this case, it may be considered that the feedback reproduction is controlled by two stages or by on/off operations according to the strength of the tactile impetus reproduction that is "consistency" and "inconsistency."

Also, the reproduction for which a specified tactile impetus is given to the "consistent" user may be considered.

Also, the reproduction may be treated by correlation (correlation=1/discrepancy) rather than the discrepancy.

The correlation, for example, may be calculated by tempo$\beta$/tempo$\alpha$-int(tempo$\beta$/tempo$\alpha$). A feedback reproduction in which as the correlation becomes higher, the predetermined tactile impetus is given stronger.

Further, in the case of the double speed consistency as illustrated in FIG. 7, it is considered that it is more difficult to perform the tempo consistency such as twice, three times, and the like. Thus, in the case of the double speed consistency, it may be treated to have a higher correlation.

Also, the feedback reproduction is not performed as the tactile impetus reproduction with the strength individually different for each user, but may be commonly reproduced to all the users.

For example, in steps F105 and F106, the strength of the discrepancy is set according to the width of distribution of movement rhythms of the respective users for the basic movement rhythm.

That is, the strength coefficient of the feedback control information is heightened to the extent that the motions of the respective users get scattered.

Accordingly, all the users can strongly feel the tactile impetus reproduction as the deviation from all the users becomes greater, and can bodily sense the coincident state of the motions of all the users simultaneously moving.

As described above, it is exemplified that the discrepancy and the correlation are calculated from the tempo values as the movement rhythms. However, as described above, it may be considered to use the movement pattern or the rhythm pattern.

In the case of obtaining the correlation from the movement pattern, for example, the maximum value of the mutual correlation coefficients of the waveforms in the X, Y, and Z directions of the acceleration sensor is multiplied by 1/lag. The lag is a time discrepancy of the maximum correlation coefficients.

If it is assumed that the irregular variations having two discrete values are x(t) and y(t), their mutual correlation coefficient $C_{xy}(r)$ is expressed as in Equation (1).

$$Cxy(r) = \frac{1}{N} \sum_{t=n}^{N-r-1} x(t)y(t+r) \quad (1)$$

Here, r denotes a parameter that indicates a parallel movement on the time axis of y(t) that is called a lag.

When the correlation is heightened, the waveforms become similar to each other, and the time discrepancy becomes smaller.

Also, in the case of using the rhythm pattern, the correlation (or the discrepancy) can be calculated by comparing the user's rhythm as shown in FIG. 8B with the rhythm pattern as the basic rhythm.

For example, the correlation can be obtained by a technique of accumulating the amount of deviation of the respective bit timings (peak timings of the movements) for a predetermined period.

Even in the case of the movement strength, the correlation can be obtained in the same manner.

[3. Second Processing Example]

The second processing example of the motion coordination operation device 1 will be described with reference to FIG. 9.

Even in the second to fourth processing examples to be described later, in the same manner as the first processing example, it is assumed that a plurality of users dances, for example, with the respective sensor devices 2 mounted on or carried by the users as shown in FIG. 2. The sensor device 2, for example, includes a detection unit 21 as the acceleration sensor, and outputs in real time the detected acceleration information through the movement information output unit 22 as the movement information.

Figure 9:
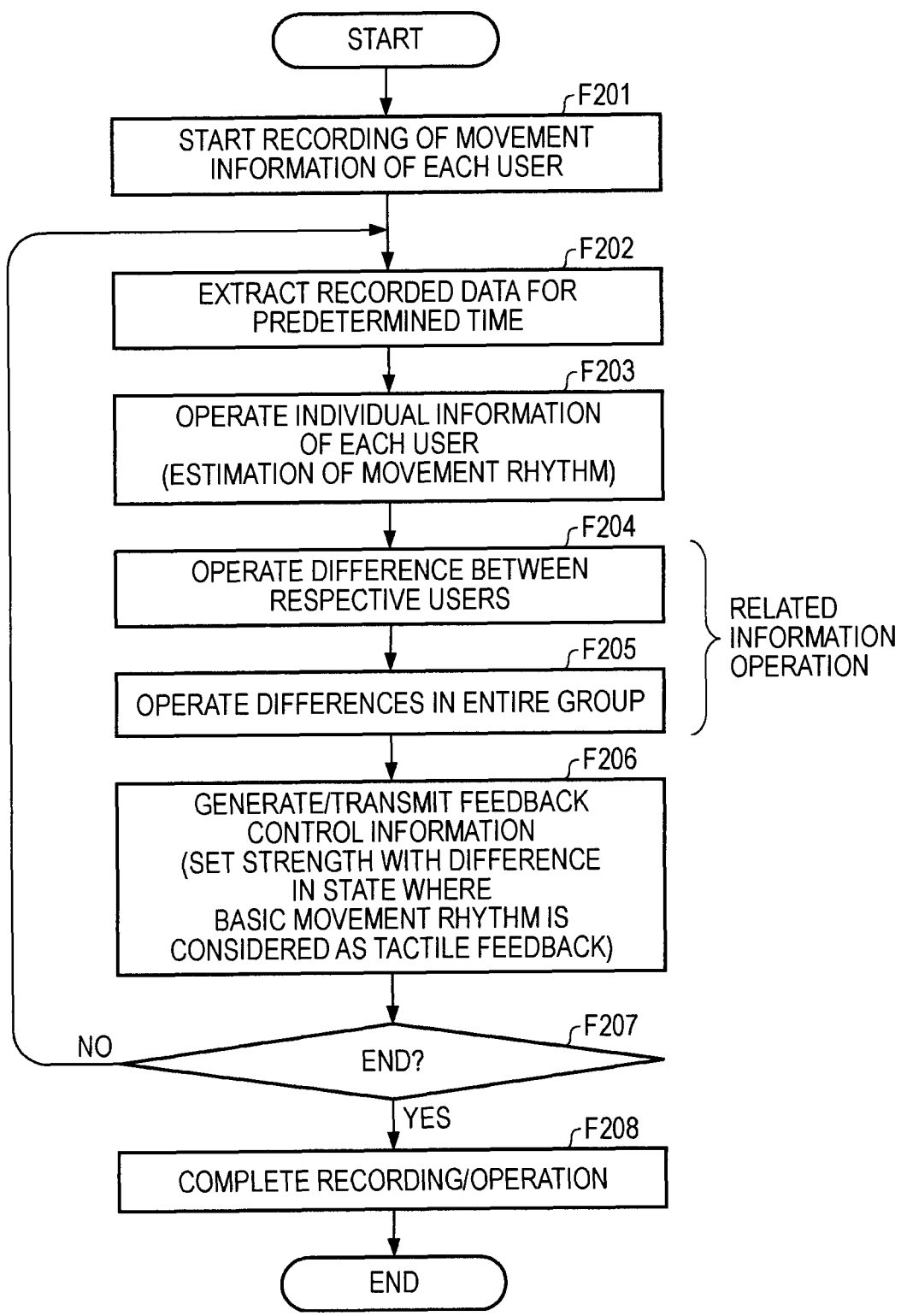
FIG. 9 is a flowchart illustrating a second processing example according to an embodiment of the present invention.

In step F201 of FIG. 9, the motion coordination operation device 1 starts the recording of the movement information. That is, if the motion information input unit 14 of the motion coordination operation device 1 receives the movement information from the respective sensor devices 2, the motion coordination operation device 1 records the received motion information in the recording unit 12. Thereafter, such a recording process is continuously performed.

In step F202, the operation unit 11 reads the movement information for a predetermined period with respect to the movement information from the respective sensor devices 2, which is recorded in the recording unit 12.

Also, in step F203, the operation unit 11 performs the individual information operation of the users of the respective sensor devices 2 using the movement information from the respective sensor devices 2, which is read from the recording unit 12. For example, the operation unit 11 determines the movement tempos as the movement rhythms of the respective users.

The above-described steps are the same as steps F101 to F103 according to the processing example 1.

In step F204, the operation unit 11 calculates the discrepancy between the respective users.

For example, in an example of three users A, B, and C, the discrepancies between users A and B, between users B and C, and between users C and A are calculated.

For example, if it is assumed that with respect to the movement tempos between two users, "tempoα" is the side having a fast tempo, and "tempoβ" is the side having a slow tempo, the discrepancy is obtained as follows.

Discrepancy=tempoα/tempoβ-int(tempoα/tempoβ)

If the discrepancies of the respective user combinations are obtained, the operation unit 11 calculates the discrepancies of the whole group in step F205. For example, an average value of the discrepancies of the respective combinations or the width of distribution becomes the discrepancy of the whole group.

In step F206, the operation unit 11 generates the feedback control information, and transmits the feedback control information from the control information output unit 13 to the feedback device 3.

The feedback control information is generated according to the discrepancy of the whole group.

For example, the operation unit 11 generates the feedback control information having high reproduction strength coefficient as the discrepancy of the whole group becomes larger (or smaller), and outputs the control information from the control information output unit 13 to the feedback device 3.

By the feedback control information, the feedback reproduction control unit 3b of the feedback device 3 controls the driving of the tactile impetus reproduction with respect to the respective reproduction devices 4 mounted on the respective users.

As the user's motions are scattered (or coincide with each other on the contrary), the feedback reproduction strength is heightened.

By this, the respective users is able to recognize the state of the correlation of all the movements through the strength of the tactile impetus reproduction.

The operation unit 11, after the processing in step F206, returns from step F207 to step F202 to continue the same process.

If the system operation is ended, the operation unit 11 proceeds from step F207 to step F208, and ends the recording process of the movement information in the recording unit 12, the operation process of the operation unit 11, and the generation/output process of the feedback control information to terminate a series of operations.

In the second processing example, the whole discrepancy is determined from the discrepancies between the user's combinations in any place, and the feedback reproduction according to the whole discrepancy is performed.

Of course, the operation may be performed according to the correlation rather than the discrepancy. Also, the discrepancy or the correlation may be determined from the movement pattern, the rhythm pattern, and the movement strength rather than the movement tempo.

[4. Third Processing Example]

The third processing example of the motion coordination operation device 1 will be described with reference to FIG. 10.

Figure 10:
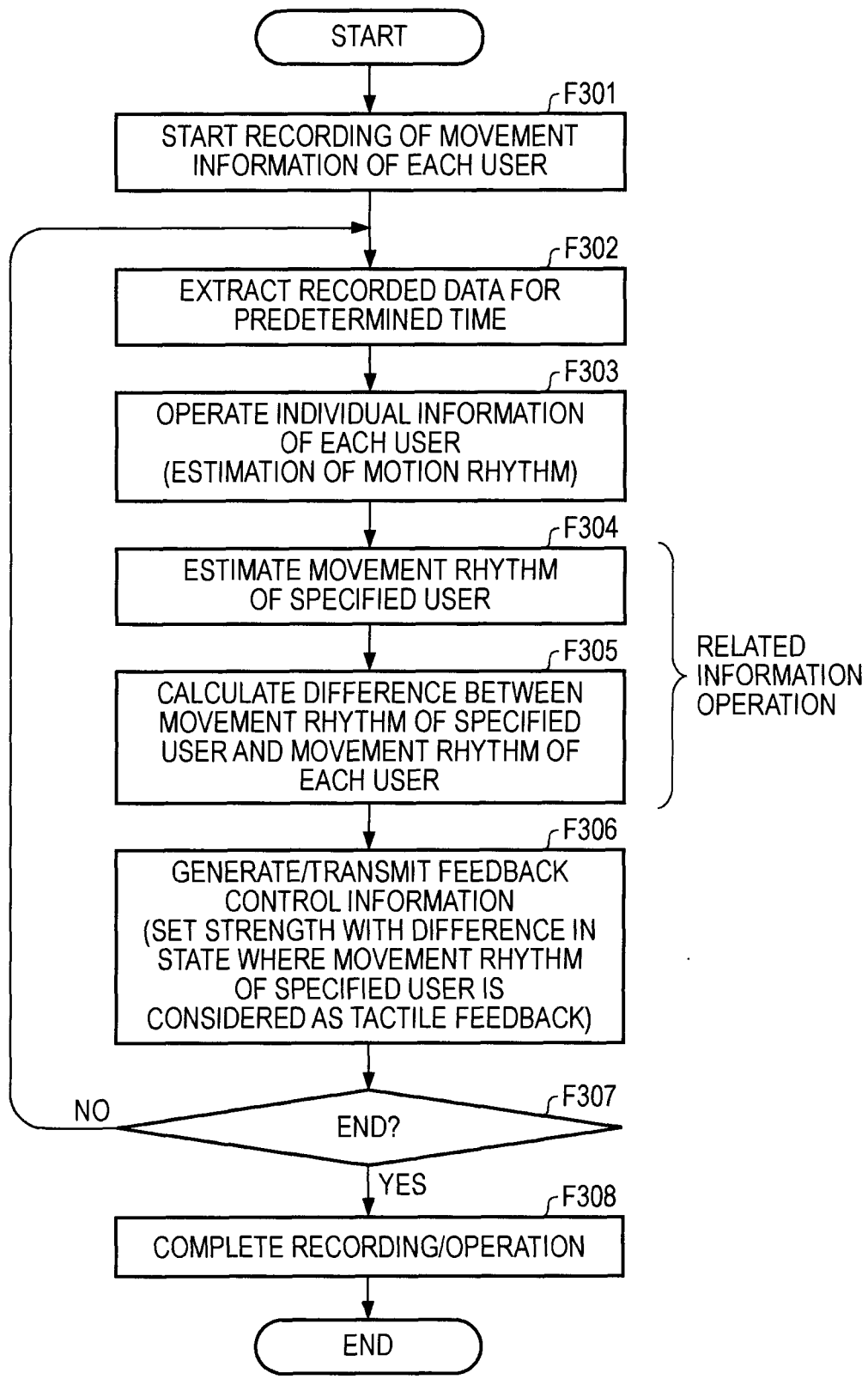
FIG. 10 is a flowchart illustrating a third processing example according to an embodiment of the present invention.

Steps F301, F302, and F303 in FIG. 10 are the same as steps F101, F102, and F103 of the processing example 1, and thus the explanation thereof will be omitted.

In step F304, the operation unit 11 estimates the movement rhythm of a specified user. For example, if one of the plurality of users is a leader in dances or the like, the user is determined as the specified user. The operation unit 11 estimates the movement rhythm from the movement information from the sensor devices 2 mounted on the specified user.

At this time, in practice, in step F303, the movement rhythm (movement tempo) is determined as the individual information of all the users, and in step F304, the movement rhythm of the specified user is selected among the movement rhythms of all the users.

In step F305, the operation unit 11 calculates the discrepancy between the movement rhythm of the specified user and the movement rhythm of each user. For example, if the user A is the specified user, the discrepancies in the movement rhythm between the specified user A and another user, such as between the users A and B, between the users A and C, between the users A and D, and the like, are calculated.

For example, if it is assumed that with respect to the movement tempos between the specified user and another user, "tempoα" is the side having a fast tempo, and "tempoβ" is the side having a slow tempo, the discrepancy is obtained as follows.

Discrepancy=tempoα/tempoβ-int(tempoα/tempoβ)

If the discrepancies of the tempos of the respective other users with respect to the tempo of the specified user A become greater, the discrepancy values become larger.

Also, in step F306, the operation unit 11 generates the feedback control information, and transmits the feedback control information from the control information output unit 13 to the feedback device 3.

The feedback control information is generated according to the discrepancies between the specified user and other users except for the specified user. That is, the tactile impetus strengths are set for the respective users according to the discrepancy values.

The operation unit 11, as the feedback control information, generates the tempo information as the movement rhythm of the specified user A and the strength coefficient according to the discrepancy values of the respective users, and outputs the control information to the feedback device 3.

The strength coefficient may be the discrepancy value itself, a value obtained by multiplying the discrepancy value by a predetermined coefficient, or a value obtained by multiplying them by a time value.

By the feedback control information, the feedback reproduction control unit 3b of the feedback device 3 controls the driving of the tactile impetus reproduction with respect to the respective reproduction devices 4 mounted on the respective users.

That is, although the tempo as the movement rhythm of the specified user A is transferred to the tactile sensation with respect to the users except for the specified user A, the tactile impetus becomes greater as the deviation of the motions from the specified user A becomes larger. That is, the user who has larger deviation of the motions from the specified user A feels the tempo of the specified user A stronger.

At this time, although it is reasonable to do so for this, it is necessary that the control information for the respective users correspond to the reproduction devices 4 mounted on the respective users. The feedback reproduction control unit 3b sets the reproduction strength of the reproduction devices 4 mounted on the user, and controls the driving of the reproduction device 4 according to the control information (strength coefficient according to the discrepancy) for the respective users.

If the tempos for the respective users coincide with that of the specified user A (for example, a dance leader or the like) as a result of comparison, the user feels small with respect to the rhythm felt with tactile sensation by the reproduction device 4, while if the tempos deviate from that of the specified user A, the user feels large with respect to the rhythm felt with tactile sensation.

The operation unit 11, after the processing in step F306, returns from step F307 to step F302 to continue the same process.

If the system operation is ended, the operation unit 11 proceeds from step F307 to step F308, and ends the recording process of the movement information in the recording unit 12, the operation process of the operation unit 11, and the generation/output process of the feedback control information to terminate a series of operations.

In the third processing example as described above, if the basic movement rhythm felt with tactile sensation becomes strong, the user feels that the user's motion deviates from the motion of a specified user, for example, the leader, and performs the dance with attention to the consistency to the leader. Accordingly, the user can be aware of the coincidence state with the leader as performing the operation, and quickly learn the movement. Also, the user can take pleasure in increasing the correlation of the motion.

In this case, the operation process may be performed by correlation rather than the discrepancy. Also, the discrepancy or the correlation may be determined from the movement pattern, the rhythm pattern, and the movement strength rather than the movement tempo.

Also, the feedback reproduction is not performed as the tactile impetus reproduction with the strength individually different for each user, but may be commonly reproduced to all the users.

For example, in steps F305 and F306, the strength of the discrepancy is set according to the width of distribution of movement rhythms of the respective users with respect to the movement rhythm of the specified user A or according to the average value of the discrepancies of the respective users.

That is, the strength coefficient of the feedback control information is heightened as the motions of the respective users get scattered.

Accordingly, all the users strongly feel the tactile impetus reproduction as the deviation from the leader becomes greater, and bodily sense the coincident state of the motions of all the users simultaneously moving, imitating the leader.

[5. Fourth Processing Example]

Figure 11:
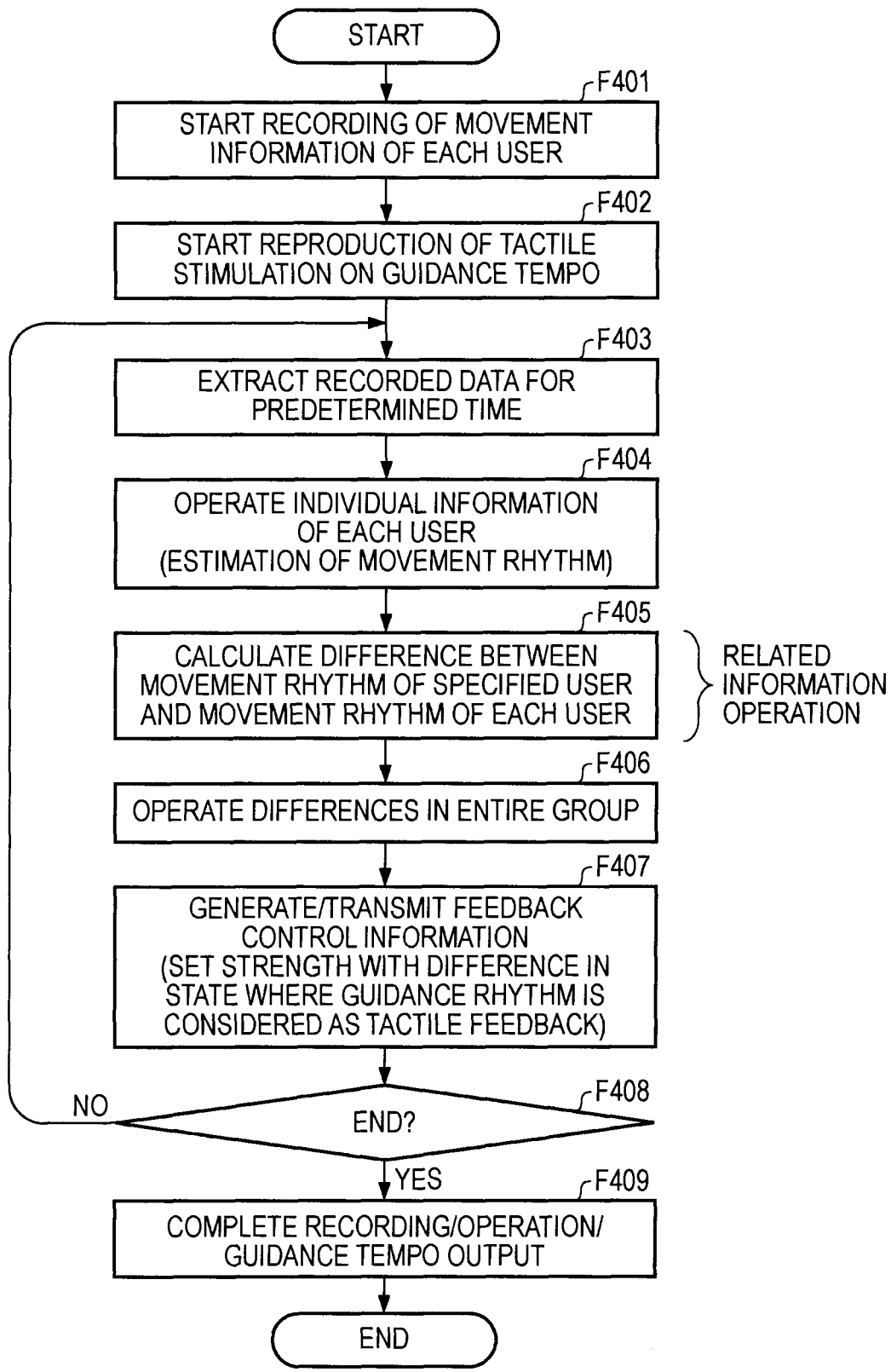
FIG. 11 is a flowchart illustrating a fourth processing example according to an embodiment of the present invention.

The fourth processing example will be described with reference to FIG. 11.

In the fourth processing example, the feedback apparatus 3 gives the guidance rhythm to the users as the tactile impetus under the control of the guidance device 5.

In step F401 as the processing of the motion coordination operation device 1, the motion coordination operation device 1 starts the recording of the movement information. That is, if the motion information input unit 14 of the motion coordination operation device 1 receives the movement information from the respective sensor devices 2, the motion coordination operation device 1 records the received motion information in the recording unit 12. Thereafter, such a recording process is continuously performed.

In step F402, the operation unit 11 generates control information for the impetus reproduction of the guidance tempo, and outputs the control information from the control information output unit 13 to the guidance device 5 and the feedback device 3. That is, the operation unit 11 instructs the necessary guidance tempo to the guidance device 5. Also, the operation unit 11 instructs starting of the tactile impetus reproduction of the guidance temp to the feedback apparatus 3. The guidance control unit 5a instructs the guidance tempo to the feedback reproduction control unit 3b according to the instruction.

Accordingly, the tactile impetus of the predetermined guidance tempo is executed by the respective reproduction devices 4, and thus the respective users bodily sense the guidance tempo.

At this time, it is also possible for the guidance reproduction unit 5b simultaneously performs the reproduction according to the guidance tempo by audio or video.

In step F403, the operation unit 11 reads the movement information for a predetermined period with respect to the movement information from the respective sensor devices 2, which is recorded in the recording unit 12.

In step F404, the operation unit 11 performs the individual information operation of the users of the respective sensor devices 2 using the movement information from the respective sensor devices 2, which is read from the recording unit 12. For example, the operation unit 11 performs the estimation of the movement rhythms. The steps F403 and F404 as described above are the same as steps F102 and F103 according to the processing example 1.

Next, in step F405, the operation unit 11 calculates the discrepancy between the tempo as the movement rhythm of the respective users and the guidance tempo.

For example, if it is assumed that with respect to the guidance tempos and the movement tempos of the respective users, "tempoα" is the side having a fast tempo, and "tempoβ" is the side having a slow tempo, the discrepancy is obtained as follows.

Discrepancy=tempoα/tempoβ-int(tempoα/tempoβ)

If the discrepancy between the user's tempo and the guidance tempo becomes greater, the discrepancy value becomes a larger value.

If the discrepancies for the respective guidance tempos are obtained with respect to the users, in step F406, the operation unit 11 calculates the discrepancy in the whole group. For example, the operation unit 11 considers the average value of the discrepancies of the respective users or the distribution width as the discrepancy of the whole group.

In step F407, the operation unit 11 generates the feedback control information, and transmits the feedback control information from the control information output unit 13 to the feedback device 3.

The feedback control information is generated according to the discrepancy of the whole group.

For example, the operation unit 11 generates the feedback control information having high reproduction strength coefficient as the discrepancy of the whole group becomes larger (or smaller), and outputs the control information from the control information output unit 13 to the feedback device 3.

By the feedback control information as described above, the feedback reproduction control unit 3b of the feedback device 3 controls the driving of the tactile impetus with respect to the respective reproduction devices 4 mounted on the respective users.

Then, as the user's motions are scattered (or coincide with each other on the contrary) with respect to the guidance tempo, the feedback reproduction strength is heightened.

By this, the respective users are able to recognize the state of the correlation of the movements through the strength of the tactile impetus reproduction.

The operation unit 11, after the processing in step F407, returns from step F408 to step F403 to continue the same process.

If the system operation is ended, the operation unit 11 proceeds from step F408 to step F409, and ends the recording process of the movement information in the recording unit 12, the operation process of the operation unit 11, and the generation/output process of the feedback control information to terminate a series of operations.

In the fourth processing example, the whole discrepancy of the motions of all the users is determined as the guidance tempo is recognized by the user, and the feedback reproduction according to the whole discrepancy is performed.

Of course, the operation may be performed according to the correlation rather than the discrepancy. Also, the discrepancy or the correlation may be determined from the movement pattern, the rhythm pattern, and the movement strength rather than the movement tempo.

[6. Applications, Modifications, and Program]

As described above, various kinds of processing examples have been described as embodiments of the present invention. Here, applications and modifications in various kinds of the processing examples will be described.

As the applications of the embodiment of the present invention, gymnastics or dances which are performed as a group as described above may be considered. In the case where a plurality of persons perform dancing, in the related art, a supervisor observes whether the motions of the dancing persons coincide with one another or the movements are filmed on video to be confirmed later. By using the system according to the examples of the present invention, the dance rhythms may be transferred to a performer in real time or in advance, and whether the performed motions are in harmony with those of other persons can be fed back.

In addition, synchronized swimming, marching, person's motions in a live place, and a rhythm game may be considered.

It is sufficient if the feedback reproduction is generated based on the synchronization of the movement state of the plural users.

It is also considered whether user movement tempos, movement strengths, movement regions, and movement patterns coincide with each other in a predetermined range, or in the case of the tempo, if the rhythm is composed of up beat and harmonic, whether to give predetermined feedback to the users.

In the tactile impetus reproduction, the strength and weakness of a beat felt by a pressure device, beat intervals, vibration strength, vibration time, and the like, are changed by the synchronization state.

Also, in the case of performing the feedback reproduction with sound or music, for example, if the movement patterns coincide with each other, it is possible to output noisy sound by overlapping a plurality of sounds in the next measure, or to give announcement to the effect that the movements harmonize with each other.

If the movement pattern is early or late, an announcement to the effect that the overlapping of music does not occur in the next measure, dissonance occurs, or the movements do not harmonize with each other, may be given. In the case were the rhythm is composed of up beat, it is also possible to add a beat sound or rhythm sound.

As the correlation becomes greater, the number of overlapping chords or volume becomes larger. On the other hand, as the correlation becomes smaller, the number of overlapping chords or volume also becomes smaller, and the number of dissonances or the volume becomes larger.

The sensor device 2 may be mounted on or carried by the user. However, for example, it is also possible to image the user's motion by a camera device and to determine the motion of the respective users by the image recognition process.

Also, for example, in the processing example 4, it is also considered that as the guidance rhythm or the reproduction by the guidance device 5 that is independent from the system operation, the next rhythm or movement direction are enlightened by giving the tactile impetus when a template exists already.

Also, when the harmonized movement has succeeded, information that has not been performed is recorded, and thus the user's motion may be turned about.

The motion coordination operation device 1 records the sensor output values in the recording unit 12 together with the time information. Based on this log, the time series movement pattern and feedback may be reproduced.

It is also possible to look back on the correlation between the user and another user or the discrepancy in motion between the user and the pre-registered template, and to use the log as the template.

The user may prepare the template of the movement. By the manipulation of the sensor device 2 (for example, acceleration sensor) attached to the body or by starting a dedicated software, the template reproduction manipulation can be performed on the software, and thus the movement thereafter may be recorded.

Also, although it is exemplified that the sensor devices 2 are mounted on the users as shown in FIG. 2 in the processing examples 1, 2, 3, and 4, the plurality of sensor devices 2 may be mounted on each user in the same manner as shown in FIGS. 3 and 4.

For example, in the processing example 1 of FIG. 5, the operations M1A and M1B in FIG. 3 are executed in step F103.

Also, in the processing example 2 of FIG. 9, the operations M2A and M2B of FIG. 4 are executed in step F204.

In other processing examples, by properly performing the operations of FIGS. 3, and 4, it is possible for the user to mount the plurality of sensor devices 2 thereon.

Also, in the embodiments, it is exemplified that the motion coordination operation device 1 records the movement information in the recording unit 12. However, according to the processing capability of the operation unit 11, the operation unit 11 may directly process the movement information received in the movement information input unit 14 without taking the recording operation.

The program will be described.

In the embodiment of the present invention, the program is a program that realizes the function of the above-described motion coordination operation device 1. For example, the program, which is installed in the computer device, starts to make the computer device execute the processes as in the processing examples 1, 2, 3, and 4.

In this embodiment, the program may be pre-recorded in an HDD as a recording medium built in an appliance such as a personal computer, a dedicated motion coordination operation device 1, or a ROM in a microcomputer having a CPU.

Also, the program may be temporarily or permanently stored in a flexible disc, CD-ROM (Compact Disc Read Only Memory), MO (Magnet Optical) disc, a DVD (Digital Versatile Disc), a Blu-ray disc, a magnetic disc, a semiconductor memory, a removable recording medium such as a memory card. The removable recording medium may be provided as so-called package software.

Also, the program may be downloaded from a download site through a network such as LAN (Local Area Network), Internet, or the like, in addition to the installation in the personal computer from the removable recording medium.

According to the corresponding program, the motion coordination operation device 1 may be realized using an information processing device such as a personal computer, and is suitable to the wide-ranged providing of the system operation.

The present application contains subject matter coordination to that disclosed in Japanese Priority Patent Application JP 2009-244304 filed in the Japan Patent Office on Oct. 23, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A motion coordination operation device comprising:
  a movement information input unit inputting movement information and position information supplied from respective sensor devices mounted on a plurality of users; and
  an operation unit operating coordination information that indicates the synchronization of motions of bodies or parts of the bodies of the plurality of users, the synchronization measured by comparing the motions of the plurality of users to one another, from the input movement information and position information from the respective sensor devices, and generating control information for feedback outputs for the users based on the coordination information,
  wherein the feedback outputs are communicated to the plurality of users via tactile sensation.

2. The motion coordination operation device according to claim 1, further comprising a recording unit;
  wherein the recording unit records the movement information input from the respective sensor devices to the movement information input unit, and
  the operation unit reads the movement information from the recording unit at predetermined intervals and performs the operation of the coordination information.

3. The motion coordination operation device according to claim 2, wherein the operation unit calculates individual information as the movements of the respective users, from the movement information provided from the respective sensor devices, and calculates the coordination information by an operation using the individual information.

4. The motion coordination operation device according to claim 3, wherein the individual information is information regarding a movement rhythm, a movement temp, a movement pattern, a rhythm pattern of the movement, or a movement strength.

5. The motion coordination operation device according to claim 3, wherein the operation unit determines basic movement information, as a group of all the users, from the individual information of the respective users, and
  calculates the coordination information by an operation using the basic movement information and the individual information.

6. The motion coordination operation device according to claim 3, wherein the operation unit calculates the coordination information, from the whole group of all the users, by the operation using the individual information of the respective users.

7. The motion coordination operation device according to claim 3 wherein the operation unit calculates the coordination information by comparing the individual information of the respective users with individual information of a specified user.

8. The motion coordination operation device according to claim 3, wherein the operation unit calculates the coordination information by comparing preset guidance movement information with individual information of the respective users.

9. The motion coordination operation device according to claim 1, wherein the operation unit generates the control information for performing different feedback outputs for the respective users.

10. The motion coordination operation device according to claim 1, wherein the operation unit generates the control information for performing the same feedback output for the plurality of users.

11. A motion coordination operation method performed by an operation processing device capable of performing information input/output and operation processes, the motion coordination operation method comprising the steps of:
  inputting movement information and position information supplied from respective sensor devices mounted on a plurality of users;
  operating coordination information that indicates the synchronization of motions of bodies or part of the bodies of the plurality of users, the synchronization measured by comparing the motions of the plurality of users to one another, from the input movement information and position information from the respective sensor devices; and
  generating control information for feedback outputs for the users based on the coordination information,
  wherein the feedback outputs are communicated to the plurality of users via tactile sensation.

12. A non-transitory computer-readable medium comprising instructions for instructing an operation processing device to execute the steps of:
  inputting movement information and position information supplied from respective sensor devices mounted on a plurality of users;
  operating coordination information that indicates the synchronization of motions of bodies or parts of the bodies of the plurality of users, the synchronization measured by comparing the motions of the plurality of users to one another, from the input movement information and position information from the respective sensor devices; and
  generating control information for feedback outputs for the users based on the coordination information,
  wherein the feedback outputs are communicated to the plurality of users via tactile sensation.

13. A motion coordination reproduction system comprising a plurality of sensor devices, a motion coordination operation device, and a feedback device;
  wherein each of the plurality of sensor devices includes a detection unit detecting user movement information, and an output unit outputting the movement information detected by the detection unit;
  wherein the motion coordination operation device includes a movement information input unit inputting movement information and position information supplied from respective sensor devices mounted on a plurality of users, the synchronization measured by comparing the motions of the plurality of users to one another, and an operation unit operating coordination information that indicates the synchronization of motions of bodies or parts of the bodies of the plurality of users from the input movement information and position information from the respective sensor devices or generating control information for feedback outputs for the users based on the coordination information;
  wherein the feedback outputs are communicated to the plurality of users via tactile sensation; and
  wherein the feedback device includes a reproduction control unit controlling the driving of a reproduction device for the users based on the control information.

* * * * *